No. 895,340. PATENTED AUG. 4, 1908.
E. C. CAPPER.
DEVICE FOR PARAFFINING RECEPTACLES.
APPLICATION FILED SEPT. 14, 1907.

UNITED STATES PATENT OFFICE.

EDWARD C. CAPPER, OF ALPHA, IOWA.

DEVICE FOR PARAFFINING RECEPTACLES.

No. 895,340.  Specification of Letters Patent.  Patented Aug. 4, 1908.

Application filed September 14, 1907.  Serial No. 392,937.

*To all whom it may concern:*

Be it known that I, EDWARD C. CAPPER, a citizen of the United States, residing at Alpha, in the county of Fayette and State of Iowa, have invented a certain new and useful Device for Paraffining Receptacles, of which the following is a specification.

In preparing buckets, tubs and other receptacles to receive butter or other substances, that are liable to deteriorate in direct contact with the containing vessel, it is customary to apply a coat of paraffin wax or similar material to the interior of the vessel, to thereby protect the contents of the vessel from direct contact with it, and to make the vessel air and water tight.

My object is to provide a device of simple, durable and inexpensive construction, by which a thin, smooth, and regular coating of paraffin wax or the like, may be quickly and easily applied to the interior of buckets, tubs and other vessels.

My invention consists in the construction, arrangement and combination of the various parts of the device, whereby the objects contemplated are attained, as hereinafter more fully set forth, pointed out in my claims and illustrated in the accompanying drawings, in which—

Figure 1 shows a vertical central sectional view of a device embodying my invention, with a vessel to be coated mounted in position on top of the device, and a vessel to be heated preparatory to applying the coating, mounted at the lower part of the device, and Fig. 2 shows a top or plan view of the device embodying my invention.

Referring to the accompanying drawings, I have used the reference numeral 10 to indicate the supporting frame of the device. At the top of the frame is a circular pan 11, designed to receive paraffin, said pan having an annular shoulder 12 formed near its central portion to receive and support the vessel to be coated. Within the bottom of the pan 11 is a steam or hot air pipe 13 communicating at one end with a valve 15, and at its other end with a discharge pipe 16, provided with a valve 17.

Arranged near the bottom of the frame 10 is a solid platform 18 designed to receive and support an inverted tub or vessel. A pipe 19 communicates with the supply pipe 14, and has a discharge end 20 projected upwardly through the center of the platform 18. This pipe 19 is provided with a valve 21 by which the passage through the pipe may be controlled, and mounted on the pipe 19 directly beneath the center of the pan 11 is an upwardly projecting pipe 22, provided with a valve 23 and a nozzle 24, which latter extends through the bottom of the pan 19 so that its discharge opening is within the pan near its bottom.

I have used the reference numeral 25 to indicate a tub or bucket which is of the kind in general use, and of itself forms no part of my present invention.

In practical use, I first place the vessel to be coated, in an inverted position upon the platform 18, and I then introduce the heating medium into the vessel through the pipe 20, by manipulating the valves. This will heat the interior of the vessel. The heating medium is also applied at the same time to the coil 13, and the pan 11 is previously supplied with a quantity of paraffin wax, which will be heated by the heating medium, and in that way formed into a liquid. Then the heated vessel is taken from the platform 18 and placed in an inverted position upon the shoulder 12 of the pan 11. Then the operator opens the valve 23 and the heating medium which is under pressure is projected through the nozzle 24 and through the liquid paraffin wax, causing the latter to be sprayed over the interior of the vessel.

By previously heating the vessel, the paraffin wax will not harden and adhere to the vessel in a thick layer, as it would do if the vessel were cold. I have found that by applying the heated liquid paraffin to a previously heated vessel, the spraying of the paraffin may be continued until every particle of the surface of the vessel is thoroughly covered, and the coating will be thin, smooth and regular throughout the entire covered surface. By having the device so arranged that one vessel is being heated while another is being coated, the operator may readily and easily coat a comparatively large number of vessels in a short time.

Any heating medium under pressure may be used in my device, and any coating material that may be applied by melting and spraying may be successfully used in my improved device.

Having thus described my invention, what I claim and desire to secure by Letters Patent of the United States, therefor, is—

1. In a device of the class described, the combination of a frame, an open topped pan supported upon the frame, and shaped to receive a quantity of coating material, and also to receive and support an inverted vessel above the material therein, means for applying heat to the pan to melt the coating material, a nozzle projected through the bottom of the pan with its upper end below the part of the pan designed to receive a vessel, and a pipe connected with said nozzle for supplying steam under pressure to it, whereby the steam passing through the nozzle will pass through the coating material in the pan and spray it throughout the interior of the vessel supported on the pan.

2. In a device of the class described, the combination of a frame, a pan supported by the frame, a platform supported by the frame, a pipe for supplying heating medium under pressure, a coil communicating with said pipe and resting in the bottom of said pan, a discharge nozzle communicating with said pipe and projected upwardly through the bottom of the pan, and a discharge branch communicating with the pipe and projected upwardly through the bottom of the platform, and valves for controlling the discharge of the heating medium through the said nozzle, and through the said discharge opening.

3. In a device of the class described, the combination of a frame, a pan supported at the top of the frame and having an annular shoulder on its interior to support an inverted vessel, a pipe for supplying heating medium under pressure, a coil communicating with said pipe and arranged within the interior of the pan, a discharge pipe communicating with said coil, a nozzle communicating with the supply pipe and projected upwardly through the bottom of the pan, a solid platform beneath the pan, a discharge pipe communicating with said supply pipe and projected upwardly through the bottom of the platform, valves for controlling the discharge through said nozzle and the discharge pipe, and valves for controlling the passage of the heating medium through the coil.

Des Moines, Iowa, Aug. 23, 1907.

EDWARD C. CAPPER.

Witnesses:
 AUGUST HILMER,
 M. E. GEISER.